Hans Reissner
INVENTOR
By Otto ___
his ATTY.

Patented Aug. 10, 1943

2,326,308

UNITED STATES PATENT OFFICE 2,326,308

CONTROL FOR VARIABLE PITCH PROPELLERS

Hans Reissner, Chicago, Ill.

Application July 15, 1939, Serial No. 284,591
In Germany August 28, 1935

15 Claims. (Cl. 170—163)

This invention relates to variable pitch propellers for airplanes and more particularly to variable pitch propellers in which the pitch change mechanism is controlled by a constant speed governor.

One object of the invention is to provide an arrangement of the type described in which the speed setting of the governor controlling the pitch change mechanism is varied in dependence upon the torque exerted by the engine on the propeller.

Another object of the invention is to construct a variable pitch propeller of the type in question in which the speed setting of the governor is modified in dependence upon the density of the air traversed by the plane.

A further object of the invention is to arrange, within the propeller-hub, mechanism reactive to variations of the torque exerted by the engine on the propeller and capable of varying the speed setting of the governor in dependence upon such torque variations.

A still further object of the invention is to construct a propeller, the hub of which is elastically secured to the engine shaft for limited circumferential oscillations relative to the latter, said oscillations being utilized for varying the speed setting of the contact speed governor.

Other objects are the arrangement of an auxiliary propeller blade oscillating relative to the propeller hub as the torque increases or decreases and varying the speed setting of the governor in dependence upon such oscillations, means being provided for continuously adjusting the pitch of the auxiliary blade to the pitch of the main blades.

Still another object of the invention is to devise a mechanism for vaying the speed setting of the governor in dependence upon the torque in such a manner that, with increasing propeller torque, the governor is adjusted to a higher speed setting and vice versa.

According to the invention, the above mentioned and other objects which will appear more clearly as the description proceeds, are accomplished by the arrangement and combination of elements set forth in the following detailed description, defined in the appended claims and illustratively exemplified in the accompanying drawings in which

Figure 1:
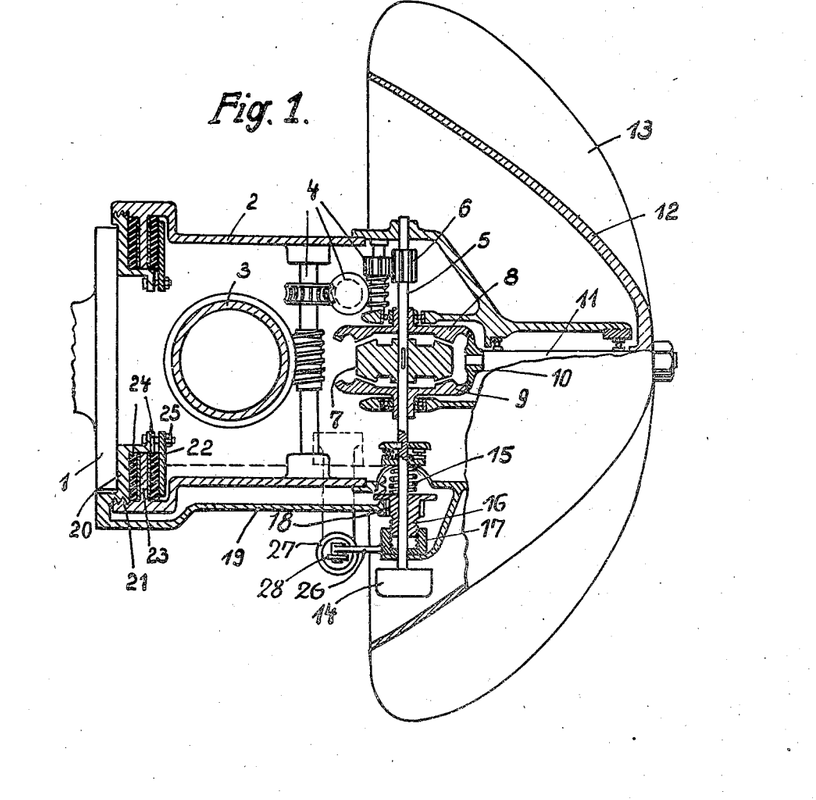
Fig. 1 is a substantially longitudinal section through a variable pitch propeller according to one embodiment of the invention.

Referring now to the drawings and first to Fig. 1, I denotes a flange on the end of the engine shaft. The hollow propeller hub 2 is mounted on flange I and carries the blade roots 3 which are rotatable about their longitudinal axes. The blade roots 3 are geared to an adjusting shaft 5 by means of intermediate gearing 4 meshing with a spur gear 6 mounted on the shaft 5.

The adjusting shaft 5 has keyed thereto a double sided claw coupling 7. Two bevel wheels 8 and 9 provided with coupling claws are idly mounted on the shaft 5, and the claws of either one of the wheels 8 or 9 may be engaged by the coupling 7. The bevel wheels 8 and 9 are rotated in opposite directions by means of a common bevel gear 10 mounted on a shaft 11. The outer end of the shaft 11 carries a hood 12 with air vanes or windmill blades 13 arranged at a predetermined pitch. The hood 12 revolves relative to the propeller hub 2 under the effect of the circumferential component of the air force acting upon its windmill blades 13. Consequently, whenever the coupling 7 engages the claws of one of the bevel wheels 8 or 9 the hood 12 produces a torque on shaft 11, which torque is utilized to drive the pitch change gear 10, 9, 8, 7, 6, 5, 4.

In order to bring the coupling 7 into engagement with the claws of one or the other of the two oppositely running bevel wheels 8 or 9 for the purpose of increasing or decreasing the pitch of the propeller blades, an axial movement of the adjusting shaft 5 is produced in dependence upon the speed of the propeller by means of a centrifugal governor including a weight 14. The governor weight 14 cooperates with a spring 15, so that the coupling 7 assumes an intermediate position disengaged from both bevel wheels 8 and 9 as long as the propeller revolves substantially at the speed to which the governor is set in accordance with the tension given to spring 15. If the propeller speed rises, the shaft 5 is shifted axially in one direction so as to bring the coupling 7 into engagement with the claws of bevel wheel 9, whereas, if the propeller speed falls, the spring 15 shifts shaft 5 in the opposite direction to effect an engagement between the coupling 7 and the claws of the other bevel wheel 8.

According to the invention, the speed setting of the governor and, thus, the operation of the pitch change gear by the latter is varied in dependence upon the torque exerted on the propeller by the engine. For this purpose, in the embodiment of Fig. 1, one end of the governor spring 15 is supported by a threaded member 16 slidably and rotatably guided on the shaft 5 and adjustable in an axially fixed nut 17 by means of a pinion 18. A rack 19, having the shape of a cylinder segment coaxial with and extending outside of and parallel to the hub 2, projects from a flange 20 rigidly secured to the shaft flange 1. The free edge of rack 19 is provided with teeth which are in mesh with the teeth of pinion 18.

The propeller hub 2 is secured to the externally threaded flange 20 by means of an internally threaded annular portion 21, the thread engagement being sufficiently loose to permit rotary movements of the hub 2 relative to the flanges 1, 20. A second flange 22 is disposed parallel to the flange 20 and at an axial distance from the latter so as to provide an annular space therebetween. Rubber washers 24 are disposed in this space on opposite sides of a third parallel flange 23 projecting inwardly from the propeller hub 2. The rubber washers 24 are fastened in position and held under compression by screw threaded bolts 25 securing flange 22 to flange 20. The rubber washers 24 engage the flanges 20, 22 and 23 with sufficient friction, produced for instance by means of radial corrugations in the rubber washers, to provide a predetermined flexibility in the connection between the shaft flange 1 and the propeller hub 2 in circumferential direction so as to permit a limited oscillation of the hub 2 relative to the engine shaft. Owing to their elasticity, the rubber washers 24 permit also relative axial displacements between the hub 2 and the flange 20, such axial displacements accompanying the circumferential oscillations because of the screw thread connection at 21.

Oscillating movements of the propeller hub 2, relative to the flanges 1, 20 connected with the engine shaft, are produced by and always proportional to the variations of the torque exerted on the propeller by the engine. Whenever such oscillations occur, the pinion 18 supported on hub 2 carries out a movement relative to the rack 19 projecting from flange 20, and an adjustment of member 16 relative to nut 17 is effected resulting in a corresponding increase or decrease in the tension of the governor spring 15. Thus, the speed setting of the governor is varied in dependence upon the variations of the propeller torque. The rubber washers 24 have the further effect of damping the propeller vibrations.

In the embodiment of the invention illustrated in Fig. 1, the speed setting of the governor is further modified in dependence upon the density of the air traversed by the plane. For this purpose, the nut 17, in which the threaded member 16 moves, is rotatably mounted on a bracket projecting from the hub 2. The nut 17 may be turned back and forth by means of a lever 26 attached through a connecting rod 28 to the movable end of a corrugated tube 27. The corrugated tube is fitted with an internal spring and placed under a vacuum in the usual manner, so that at every barometric pressure it has a definite length, and, through the parts 28, 26, 17 and 16 affects the tension of the governor spring 15 and, therefore, the speed setting of the governor.

Figure 2:
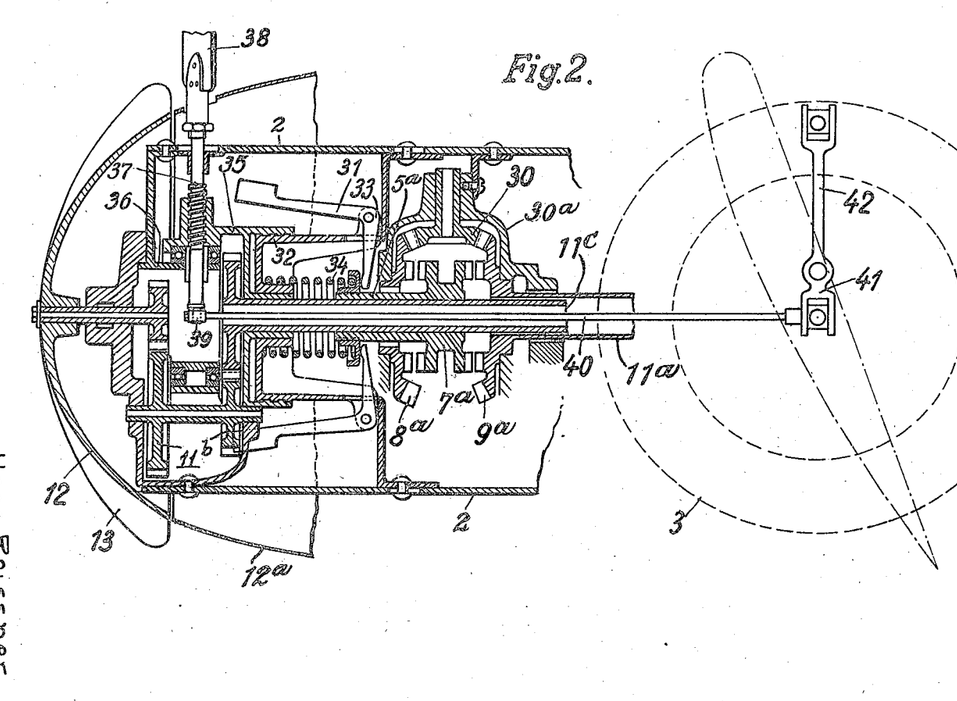
Figs. 2 and 3 are partial longitudinal and transverse sections, respectively, of a propeller according to a second embodiment provided with an auxiliary blade.
Figure 3:
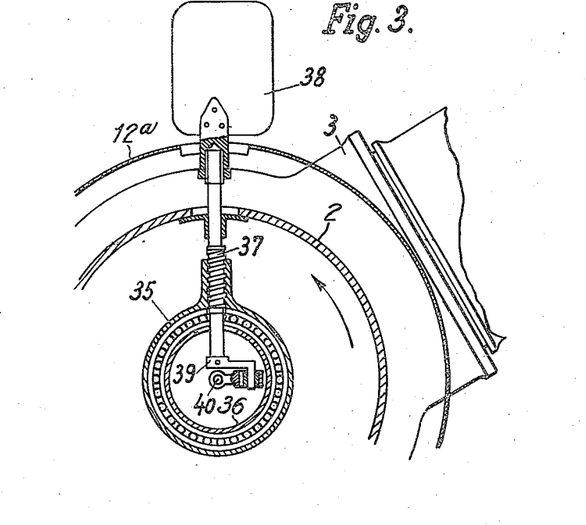

In the embodiment of the invention illustrated in Figs. 2 and 3, a hollow shaft 11c is continuously rotated from the windmill blade hood 12, 13 through gearing 11b. The rear end of shaft 11c is rotatably supported in the forward end of a second hollow shaft 11a, extending coaxially with shaft 11c and serving to turn the blade roots through an intermediate gearing (not shown). Fixed on the forward end of shaft 11a is a bevel wheel 9a. A housing portion 30a, providing an outer bearing for shaft 11a and bevel wheel 9a, supports a second bevel wheel 8a forwardly spaced from and coaxial with the bevel wheel 9a and coupled to the latter for rotation in opposite direction by means of a connecting bevel wheel 30 rotatably mounted in the housing 30a. The bevel wheels 8a and 9a are both provided with coupling claws on the sides thereof facing each other. A double-sided claw coupling 7a is mounted axially shiftably on shaft 11c between the bevel wheels 8a and 9a and rotates with the shaft 11c. The coupling 7a is integral with a governor controlled sleeve 5a.

The governor comprises angle levers 31 pivotally mounted on a bearing body 32. One arm of each angle lever 31 carries a centrifugal weight, while the other angle arm 33 acts on the sleeve 5a. A governor spring 34, disposed within and having one end thereof supported by the bearing body 32, acts with its other end on a flange of sleeve 5a to counterbalance the action of the centrifugal weights. Thus, the speed setting of the governor is determined by the tension given to spring 34 on the one hand and by the axial position of the pivot points of levers 31, on the other hand.

If the speed of the propeller exceeds that to which the governor is set, the centrifugal weights fly outwardly and the levers arms 33 push the sleeve 5a towards the left against the action of spring 34. As a result, the coupling 7a engages the claws of the bevel wheel 8a, and the latter, through the intermediate wheel 30, rotates the other bevel wheel 9a and shaft 11a in a direction opposite to that of the rotation of shaft 11c. This rotation of shaft 11a is utilized, by means of suitable gears, such as shown in Fig. 1, to increase the pitch of the propeller blades. If, on the other hand, the propeller speed falls below the speed to which the governor is set, the spring 34 shifts the sleeve 5a towards the right and the coupling 7a is brought into direct engagement with the claws of bevel wheel 9a. In this case, the shaft 11a is rotated in the same direction as shaft 11c so as to decrease the pitch of the propeller blades.

In order to permit automatic variations in the speed setting of the governor, the bearing body 32 which rotates with the main hub of the propeller, is screw threaded axially displaceably into a housing part 35. The housing part 35 is mounted in ball bearings on a hub portion 36 rigid with the main hub of the propeller so as to permit limited oscillations of the part 35 relative to said hub and the bearing body 32. Owing to the described screw thread connection between the bearing body 32 and part 35, oscillations of the latter effect axial displacements of the former, which axial displacements produce corresponding variations in the tension of spring 34, and in the axial positions of the pivot points of lever 31. Different speed settings of the governor are thus obtained.

The oscillations of the housing part 35 are effected by the circumferential component of the air of flight acting against an auxiliary blade 38. The auxiliary blade 38 is secured on the outer end of a radially disposed spindle 37 passing through a slot in an outer protective casing 12a mounted on and surrounding the main hub of the propeller, so as to form a rearward extension of hood 12. The spindle 37 has a threaded midportion screwed rotatably into a threaded bore of the housing part 35. The inner end of spindle 37 is connected through a crank 39 and a connecting rod 40 with the shorter arm 41 of a two armed lever, the longer arm 42 of said lever engages the blade root 3 of one of the main propeller blades. By this arrangement, the auxiliary blade 38 is always adjusted to exactly the same pitch angle as the main blades, and, as a result, the auxiliary blade is always subject to a thrust and a torque which are proportional to the thrust and the torque acting on the main hub of the propeller. Therefore, the housing part 35 carrying the auxiliary blade 38 always takes up the same fraction of the total torque. A spring (not illustrated) tends to draw the auxiliary blade 38 into a neutral position. If the torque exerted by the engine on the propeller changes, the circumferential component of the air force acting on the auxiliary blade 38 effects, against the action of the neutralizing spring, an oscillation of the housing part 35 relative to the bearing body 32, thereby varying the positions of the pivot points of levers 31 and the tension of spring 34 so as to change the speed setting of the governor.

Figure 4:
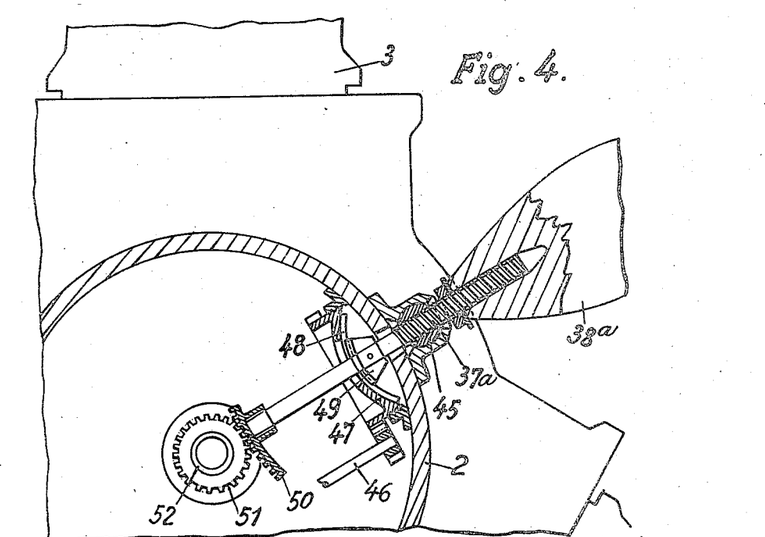
Fig. 4 is a partial transverse section of a propeller embodying a modification of the auxiliary blade.

In the modification illustrated in Fig. 4, the auxiliary blade 38, instead of oscillating about the propeller axis, oscillates about an axis approximately coinciding with its own center of gravity. In this case, a cylinder member 45 is mounted with its axis parallel to the propeller axis in a bearing secured to the propeller hub 2. The spindle 37a of the auxiliary blade 38 passes diametrically through the cylinder member 45 and is rotatably secured thereto by means of a threaded spindle portion engaging a correspondingly threaded bore of the cylinder member 45. In order to effect a pitch adjustment of the auxiliary blade 38 corresponding to that of the main blades, a spur wheel on a shaft 46 driven through gearing (not shown) from the root 3 of one of the main blades, meshes with outer gear teeth on a socket 47 rotatably secured to the propeller hub 2 by means of a screw thread connection. A rib 48 on the curved inner surface of socket 47 is engaged by a grooved guide member 49 keyed to the spindle 37a. Thus, the auxiliary blade 38 while being free for limited oscillation about the axis of cylinder member 45, is always turned to the same pitch as the main blades. The inner end of spindle 37a is disposed rotatably in a hollow boss provided on an arcuate rack 50, in permanent mesh with a toothed wheel 51, so that the rack 50 is oscillated by the blade 38 without participating in the rotary movements of the latter. The toothed wheel 51 is fast on a shaft 52 which is coaxial with the propeller shaft and serves to displace the bearing body 32 of Fig. 2 in axial direction by means of a thread engagement between the body 32 and the housing part 35, the latter, in the embodiment according to Fig. 4, being rigid with the shaft 52.

Figure 5:
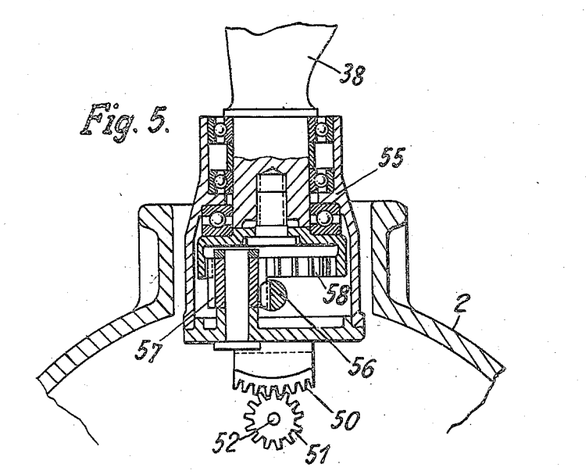
Figs. 5 and 6 are, respectively, a transverse section and a partial longitudinal section of an auxiliary blade arrangement with toothed wheel gearing.
Figure 6:
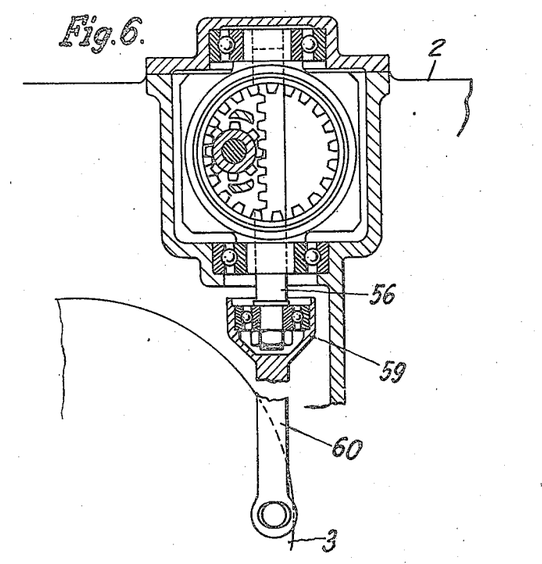

According to Figs. 5 and 6, the auxiliary blade 38 is rotatably mounted in a bearing sleeve 55, which latter is supported on ball bearings on the hub 2 for oscillation about the longitudinal axis of an elongated rack 56 extending parallel to the propeller axis. A spur gear wheel 57 is mounted within the sleeve 55 so as to engage inner teeth 58 on the root of the auxiliary blade 38 on the one hand, and to be in permanent mesh with the rack 56 on the other hand. The rack 56 is secured by means of a swivel coupling 59 to one end of a rod 60, the other end of said rod being connected to the root 3 of one of the main propeller blades. As a result, the auxiliary blade 38, irrespectively of its oscillation about the axis of rack 56, is always adjusted to a pitch corresponding exactly to that of the main blades. In this construction, the auxiliary blade 38 varies the speed setting of the governors by means of an arcuate rack 50 on the inner end of the oscillating sleeve 55, said rack 50 being in mesh with a toothed wheel 51 on a shaft 52 serving to vary the speed setting of the governor as described in connection with Fig. 4.

Figure 7:
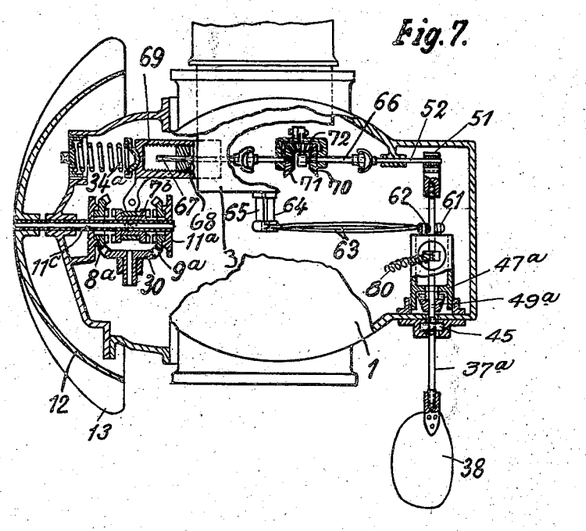
Figs. 7 and 8 are, respectively, simplified longitudinal and transverse sections of an auxiliary blade arrangement with jointed shaft gearing.
Figure 8:
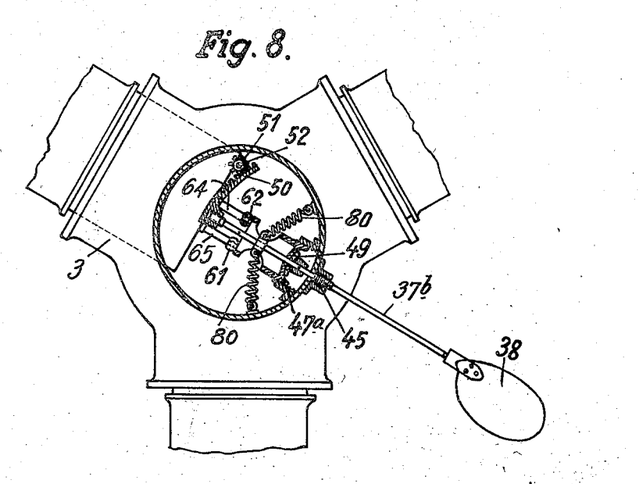

In the construction illustrated in Figs. 7 and 8, the spindle 37b of the auxiliary blade 38 is, as in Fig. 4 rotatably mounted in an oscillating cylinder 45, an arcuate rack 50 mounted on the inner end of the spindle 37b, engaging a toothed wheel 51 fast on a shaft 52. Two springs 80 tend to hold the blade 38 in a neutral position subject to oscillations caused by variations of the torque. The pitch adjustment of the auxiliary blade 38 is effected by means of a grooved guide member 49a cooperating with a rotatable socket 47a provided with a curved rib. In the embodiment according to Figs. 7 and 8, the socket 47a carries two pins 61 and 62 connected crosswise by rods 63 to corresponding pins 64 and 65, respectively, the pins 64 and 65 being mounted on the root 3 of one of the main propeller blades. Owing to this arrangement, the auxiliary blade 38 receives the same pitch changing rotation as the main propeller blades.

As shown in Fig. 7, the governor comprises a hollow internally threaded cylindrical main weight 69 pivoted to the propeller hub with its longitudinal axis substantially parallel to the propeller axis, a lever arm rigid with the weight 69 and engaging the coupling 7b, a governor spring 34a, and an auxiliary weight member 68 disposed within and adjustable along the main weight 69 by means of outer screw threads cooperating with the inner screw threads of the latter. The gear for varying the speed setting of the governor in dependence upon the rotations of shaft 52 comprises a shaft 66 connected at one end thereof with shaft 52 by means of a universal joint and having universally jointed to its other end an extension shaft 67 of square cross-section passing through a square central perforation provided in the auxiliary weight 68. By this arrangement, the centre of gravity of the governor weight 68/69 is displaced relative to its fulcrum by means of the auxiliary blade 38 and the length of the lever is varied in such a manner, that the governor weight 68, 69 is in equilibrium with the governor spring 34a at different speeds of rotation. Thus, the coupling 7b is held in its intermediate inoperative position at different propeller speeds in dependence upon the position of auxiliary blade 38 relative to the main hub of the propeller. It should be noted that the displacement of the auxiliary weight 68 is not affected by the centrifugal force because it takes place substantially paralel to axis of rotation.

In the construction of Figs. 7 and 8 the speed setting of the governor is also barometrically modified. The shaft 66 comprises two parts each carrying a bevel gear 70 and 71, respectively, and a planet wheel 72 engaging both bevel gears 70 and 71 is arranged for rotation about its own axis and for oscillation about the axis of the shaft 66. This latter oscillation, which is effected by means of a barometric device 28a, affects the transmission of rotary motion from bevel gear 70 to bevel gear 71, thereby modifying the speed setting of the governor.

In the constructions described, the internal arrangement of the elements of a constant speed governor for a variable pitch airplane propeller remains the same as long as the torque exerted by the engine on the propeller does not vary. As soon as this torque changes, owing for instance to an increase or decrease in the fuel supply, the variation of the torque affects the internal arrangement of the governor elements thereby varying the speed setting of the governor and transforming the whole arrangement from a propeller of one constant engine speed into a propeller of another constant engine speed. For different air densities this function is further modified by an additional barometric device.

Having described the invention, what I claim as new and desire to have protected by Letters Patent, is:

1. A variable pitch propeller for airplanes having constant speed governors embodying therein a propeller hub, blades capable of pitch change, a pitch changing mechanism, driving means for said mechanism, a governor operative upon said pitch changing mechanism, said governor including an element adjustable to different positions for varying the speed setting of the governor, and a member arranged for limited oscillations relative to said propeller hub in direct dependence upon the torque exerted on the propeller by the engine, said member cooperating with said adjustable element to vary the speed setting of the governor in dependence upon the variations of said torque.

2. A variable pitch propeller for airplanes having constant speed governors, embodying therein a propeller hub, blades capable of pitch changes, a pitch changing mechanism, driving means for said mechanism, a governor operative upon said pitch changing mechanism, said governor including an element adjustable to different positions for varying the speed setting of the governor, a member arranged for limited oscillations relative to said propeller hub in direct dependence upon the torque exerted on the propeller by the engine, said member cooperating with said adjustable element to vary the speed setting of said governor in dependence upon the variations of said torque, and barometric means arranged for cooperation with said adjustable element to modify the speed setting of said governor in dependence upon the density of the air traversed by the plane.

3. A variable pitch propeller for airplanes having constant speed governors, embodying therein a propeller hub, blades capable of pitch changes, a pitch changing mechanism, driving means for said mechanism, a governor operative upon said pitch changing mechanism and including a spring, a weight operated by centrifugal force against said spring, and a spring block adjustable to different positions for varying the tension of said spring and the speed setting of the governor, and a member arranged for limited oscillations relative to said propeller hub in direct dependence upon the varying torque exerted on the propeller by the engine, said member being operatively connected with said spring block to vary the tension of said governor spring and, thus, the speed setting of said governor, in dependence upon the displacement of said member.

4. A variable pitch propeller for airplanes having constant speed governors, embodying therein a propeller hub, blades capable of pitch changes, a pitch changing mechanism, driving means for said mechanism, a governor operative upon said pitch changing mechanism and including an adjustable element, a spring, a weight lever pivoted to said adjustable element and acting on said spring, and a weight operated by centrifugal force, and a member arranged for limited oscillations relative to said propeller hub in direct dependence upon the varying torque exerted on the propeller by the engine, said member being operatively connected with said adjustable element to vary the position of the latter and, thus, the speed setting of said governor in dependence upon the displacement of said member.

5. A variable pitch propeller for airplanes having constant speed governors, embodying therein a propeller hub, blades capable of pitch changes, a pitch changing mechanism, driving means for said mechanism, a governor operative upon said pitch changing mechanism, said governor including a spring, a weight lever acting on said spring and a weight operated by centrifugal force, and a member arranged for limited oscillations relative to said propeller hub in direct dependence upon the torque exerted on the propeller by the engine, said member being operatively connected with said weight lever to vary the length of the latter and, thus, the speed setting of the governor, in dependence upon the displacements of said member.

6. A variable pitch propeller for airplanes having constant speed governors, embodying therein blades capable of pitch changes, a pitch changing mechanism, means actuated by the air of flight and developing forces to be applied to said mechanism, a governor operative upon said pitch changing mechanism, said governor including an element adjustable to different positions for varying the speed setting of the governor, a circumferentially elastic connection between the propeller and the driving shaft, and two cooperating members having movement relative to each other on a change of the torque exerted on the propeller by the engine, one of said members being operative upon said adjustable element to vary the speed setting of said governor in dependence upon said relative movement.

7. A variable pitch propeller for airplanes having constant speed governors, embodying therein blades capable of pitch changes, a pitch changing mechanism, means actuated by the air of flight and developing forces to be applied to said mechanism, a governor operative upon said pitch changing mechanism, said governor including an element adjustable to different positions for varying the speed setting of the governor, a circumferentially elastic connection between the propeller and the driving shaft formed by a bearing co-axial with the shaft axis and a tangentially operating resilient means limiting the rotation of said bearing, and two cooperating members mounted on said propeller and driving shaft, respectively, and having movement relative to each other on a change of the torque exerted on the propeller by the engine, one of said members being operative upon said adjustable element to vary the speed setting of said governor in dependence upon said relative movement.

8. A variable pitch propeller for airplanes having constant speed governors, embodying therein a propeller hub carrying blades capable of pitch changes, a pitch changing mechanism, means actuated by the air of flight and developing forces to be applied to said mechanism, a governor operative upon said pitch changing mechanism, said governor including an element adjustable to different positions for varying the speed setting of the governor, a circumferentially elastic connection between the propeller and the driving shaft consisting of a hub upon the propeller shaft, spaced flanges carried upon the engine shaft, said propeller hub having a flange positioned between said spaced flanges upon said shaft, and annular rubber washers under compression seated between said flanges, respectively, and two cooperating members mounted on said propeller hub and driving shaft, respectively, and having movement relative to each other on a change of the torque exerted on the propeller by the engine, one of said members being operative upon said adjustable element to vary the speed setting of said governor in dependence upon said relative movement.

9. A variable pitch propeller for airplanes having constant speed governors, embodying therein blades capable of pitch changes, a governor shaft, gearing between said shaft and said propeller blade including a worm gear and a worm shaft, a clutch member secured to and rotatable with said shaft, co-operating clutch gears idly mounted upon said shaft upon opposite sides of said clutch member, a gear enmeshed with both of said last named gears, a member carrying air vanes and being operative upon said last named gear, a centrifugal governor operative upon said shaft, a spring acting upon said shaft to normally maintain said clutch member out of engagement with both of said gears, and means dependent on the torque exerted on the propeller by the engine for varying the tension of said spring and controlling the action of said centrifugal governor in relation to said shaft and said clutch member.

10. A variable pitch propeller for airplanes having constant speed governors, embodying therein a hollow hub, blades carried thereby and capable of pitch changes, and means carried within and supported from said hub for automatically changing the pitch of said blades, consisting of a governor shaft, gearing between said shaft and said propeller blade including a worm gear and a worm shaft, a clutch member secured to and rotatable with said shaft, co-operating clutch gears idly mounted upon said shaft upon opposite sides of said clutch member, a gear enmeshed with both of said last named gears, a member carrying air vanes and being operative upon said last named gear, a centrifugal governor operative upon said shaft, a spring acting upon said shaft to normally maintain said clutch member out of engagement with both of said gears, and means dependent on the torque exerted on the propeller by the engine for varying the tension of said spring and controlling the action of said centrifugal governor in relation to said shaft and said clutch member.

11. A variable pitch propeller for airplanes having constant speed governors, embodying therein blades rotatable about the axis of the propeller shaft and capable of pitch changes, a pitch changing mechanism, means actuated by the air of flight and developing forces to be applied to said mechanism, a governor mechanism operative upon said pitch changing mechanism, an auxiliary propeller blade capable of pitch changes, rotatable co-axially with said first named propeller and capable of independent movement about said axis, connections between said first named blades and said auxiliary blade, whereby all blades always have the same pitch, and connections between said auxiliary blade and said governor mechanism, whereby torque exerted on said first named blades and said auxiliary blade by the engine controls the speed setting of said governor mechanism and the application of forces for changing the pitch of all the blades.

12. A variable pitch propeller for airplanes having constant speed governors, embodying therein blades rotatable about the axis of the propeller shaft and capable of pitch changes and having a crank thereon, a pitch changing mechanism, means actuated by the air of flight and developing forces to be applied to said mechanism, a governor mechanism operative upon said pitch changing mechanism, an auxiliary propeller blade capable of pitch changes and having a crank thereon, rotatable co-axially with said first named propeller and capable of independent movement about said axis, a rod connecting the cranks upon said first named blades and said auxiliary blade, whereby all the blades always have the same pitch, and connections between said auxiliary propeller and said governor mechanism, whereby torque exerted on said first named blade system and said auxiliary blade by the engine controls the speed setting of said governor mechanism and the application of forces for changing the pitch of all the blades.

13. A variable pitch propeller for airplanes having constant speed governors, embodying therein main blades rotatable about the axis of the propeller shaft and capable of pitch changes, a pitch changing mechanism including a clutch mechanism, means actuated by the air of flight and developing forces to be applied to said mechanism, a governor mechanism operative upon said clutch mechanism including a main weight, a spring acting thereon, an adjustable weight member, a screw threaded connection between said weight members, a shaft non-rotatably and slidably connected with said adjustable weight member, an auxiliary propeller blade disposed substantially radially of the propeller axis, said auxiliary blade having rotary movement about its own axis for change of its pitch and oscillatory movement about an axis parallel to the propeller axis for varying the speed setting of said governor mechanism, connections between said auxiliary blade and said shaft including a gear wheel fast on said shaft and an arcuate gear carried by said auxiliary blade, and connections between one of said main blades and said auxiliary propeller blade, whereby the pitch of the latter is always adjusted to the pitch of the main blades.

14. A variable pitch propeller for airplanes having constant speed governors, embodying therein main blades rotatable about the axis of the propeller shaft and capable of pitch changes, a pitch changing mechanism including a clutch mechanism, means actuated by the air of flight and developing forces to be applied to said mechanism, a governor mechanism operative upon said clutch mechanism including a main weight, a spring acting thereon, an adjustable weight member, a screw threaded connection between said weight members, a shaft non-rotatably and slidably connected with said adjustable weight member, gearing connecting said shafts, an auxiliary propeller blade disposed substantially radially of the propeller axis, said auxiliary blade having rotary movement about its own axis for change of its pitch and oscillatory movement about an axis parallel to the propeller axis for varying the speed setting of said governor mechanism, connections between said auxiliary blade and said shaft including a gear wheel carried by said shaft and an arcuate gear fast on said auxiliary blade, connections between one of said main blades and said auxiliary propeller blade, whereby the pitch of the latter will always be adjusted to the pitch of the main blades, and means responsive to different air densities for modifying the operative effect of said auxiliary blade upon said governor mechanism.

15. A a variable pitch propeller for airplanes having constant speed governors, embodying therein main blades rotatable about the axis of the propeller shaft and capable of pitch changes, a pitch changing mechanism including a clutch mechanism, means actuated by the air of flight and developing forces to be applied to said mechanism, a governor mechanism operative upon said clutch mechanism including a main weight, a spring acting thereon, an adjustable weight member, a screw threaded connection between said weight members, a shaft non-rotatably and slidably connected with said adjustable weight member, an auxiliary propeller blade disposed substantially radially of the propeller axis, said auxiliary blade having rotary movement about its own axis for changing its pitch and oscillatory movement about an axis parallel to the propeller axis for varying the speed setting of said governor mechanism, connections between said auxiliary blade and said shaft including a gear wheel fast on said shaft and an arcute gear carried by said auxiliary blade, opposed springs resisting oscillation of said auxiliary blade and tending to normally make said clutch mechanism inoperative, and connections between one of said main blades and said auxiliary propeller blade, whereby the pitch of the latter will always be adjusted to the pitch of the main blades.

HANS REISSNER.